US007697696B2

(12) United States Patent
Okumura

(10) Patent No.: US 7,697,696 B2

(45) Date of Patent: Apr. 13, 2010

(54) AUDIO AMPLIFICATION APPARATUS WITH HOWLING CANCELER

(75) Inventor: Hiraku Okumura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1136 days.

(21) Appl. No.: 11/326,166

(22) Filed: Jan. 4, 2006

(65) Prior Publication Data

US 2006/0172272 A1 Aug. 3, 2006

(30) Foreign Application Priority Data

Jan. 12, 2005 (JP) ............................ 2005-004983

(51) Int. Cl.
*H04B 3/20* (2006.01)

(52) U.S. Cl. ........................ 381/66; 381/93; 381/71.11; 379/406.08

(58) Field of Classification Search ........................ 379/406.01-406.16; 381/66, 83, 93, 71.1, 71.9, 381/71.11, 94.1, 94.6, 95, 96, 120, 121, 306; 434/307 A See application file for complete search history.

(56) References Cited

U.S. PATENT DOCUMENTS 4,747,132 A * 5/1988 Ibaraki et al. .......... 379/406.12
4,894,820 A 1/1990 Miyamoto et al.
5,390,250 A 2/1995 Janse et al.
5,442,712 A * 8/1995 Kawamura et al. ............ 381/83
5,463,618 A 10/1995 Furukawa et al.
5,535,194 A 7/1996 Ashley et al.
5,692,055 A * 11/1997 Sano et al. ............... 381/71.11
5,710,823 A * 1/1998 Nagata et al. ................ 381/83
5,721,771 A 2/1998 Higuchi et al.

(Continued)

FOREIGN PATENT DOCUMENTS

EP 0884886 A2 12/1998

(Continued)

OTHER PUBLICATIONS

Taiwan Search Report (No. 095100389; dated Jan. 12, 2005; 1 pg.).

(Continued)

*Primary Examiner*—Xu Mei
*Assistant Examiner*—Jason R Kurr
(74) *Attorney, Agent, or Firm*—Pillsbury Winthrop Shaw Pittman

(57) ABSTRACT

In an audio amplification apparatus connected to a microphone and a speaker, an audio amplification circuit amplifies an audio signal and inputs the amplified audio signal to the speaker. A howling canceller has an adaptive filter which is set with a filter coefficient based on the audio signal input to the speaker and a residual signal so as to simulate a feedback transmission path from the speaker to the microphone such that the adaptive filter processes the audio signal to produce a simulation signal. The residual signal is obtained by subtracting the simulation signal from an input audio signal inputted from the microphone and fed to the audio amplification circuit. An internal sound source generates the audio signal and inputs the audio signal to the speaker. A sound source determination portion determines whether or not the input audio signal contains an external audio signal provided from an external sound source other than the audio signal fed back from the speaker to the microphone, and controls update of the filter coefficient in accordance with a result of the determination.

9 Claims, 4 Drawing Sheets

U.S. PATENT DOCUMENTS

| | | | | |
|---|---|---|---|---|
| 6,215,880 | B1 * | 4/2001 | Hasegawa | 381/66 |
| 2002/0041678 | A1 | 4/2002 | Basburg-Ertem et al. | |
| 2002/0064291 | A1 | 5/2002 | Kates et al. | |

FOREIGN PATENT DOCUMENTS

| | | | |
|---|---|---|---|
| EP | 0969692 | A1 | 1/2000 |
| EP | 1278396 | A2 | 1/2003 |
| JP | 08-033091 | | 2/1996 |
| JP | 08-292782 | | 11/1996 |
| JP | 10-078776 | | 3/1998 |
| JP | 10-111691 | | 4/1998 |
| JP | 11-146484 | | 5/1999 |
| TW | 549781 | | 8/2003 |

OTHER PUBLICATIONS

Japanese Patent Office: Notification of Reasons for Rejection, (No. 2005-004983; dated Aug. 19, 2008; 5 pgs.).

Inazumi, Imai, and Konishi, Prevention of Howling in the Audio Amplification System Using the LMS Algorithm, Lecture Thesis Collection, The Acoustical Society of Japan, pp. 417-418, (Mar. 1991).

* cited by examiner

AUDIO AMPLIFICATION APPARATUS WITH HOWLING CANCELER

BACKGROUND OF THE INVENTION

1. Technical Field

The present invention relates to an audio amplification apparatus provided with a howling canceller to prevent howling.

2. Related Art

An audio amplification apparatus amplifies an audio signal supplied from a microphone and inputs the amplified signal to a speaker. The audio amplification apparatus forms a closed loop from the speaker to the microphone. It is well known that the audio signal output from the speaker is fed back to the microphone, and repeatedly amplified to cause howling.

To prevent such howling, it has long been proposed that an adaptive filter is used to generate a simulation signal for simulating a feedback audio signal and that a howling canceller is used for the audio amplification apparatus to subtract the simulation signal from an input signal supplied from a microphone (see non-patent document 1). The howling canceller has a delay portion for delaying an audio signal to be input to the speaker. The delay portion provides a delay time to the audio signal corresponding to a traveling time of the audio signal fed back from the speaker to the microphone. The adaptive filter generates a simulation signal by performing a convolution of the delayed signal with an adaptive filter coefficient. An adder portion subtracts the simulation signal from the input signal supplied from the microphone to leave a residual signal that is then supplied to an amplifier portion. The residual signal is amplified by the amplifier portion and is input to the speaker that generates a sound. The adaptive filter is supplied with the residual signal as a reference signal. A known adaptive algorithm (e.g., LMS (Least Mean Square) algorithm) is used to calculate and update the adaptive filter coefficient so as to minimize the residual signal. In this manner, the simulation signal is approximated to the feedback audio signal to prevent the howling.

A known karaoke machine is a kind of the audio amplification apparatus and performs a correlation operation between an audio signal from a sound source such as CD and an input signal from the microphone to find a correlation function for a feedback transmission path from the speaker to the microphone. The karaoke machine uses this correlation function to monitor the degree of risk of howling occurrence. When the risk of howling occurrence is higher than or equal to a specified level, the karaoke machine notifies a user of the risk or decreases the gain of a particular frequency that highly possibly causes the howling.

[Non Patent Document 1] Inazumi, Imai, and Konishi, "Prevention of howling in the audio amplification system using the LMS algorithm," lecture thesis collection pp. 417-418, The Acoustical Society of Japan, March, 1991.

[Patent Document 1] Japanese Patent Application Laid-Open Publication No. 8-33091

As mentioned above, the conventional howling canceller employing the adaptive filter uses the residual signal to calculate an adaptive filter coefficient so as to minimize a difference between the simulation signal and the feedback audio signal. In this manner, the simulation signal approximates to the feedback audio signal. However, a narrator's audio signal is included in the audio signal supplied from the microphone. The residual signal as a reference supplied to the adaptive filter contains not only a difference between the feedback audio signal and the simulation signal, but also the external audio signal. When such residual signal is used as the reference, it has been difficult to improve the calculation accuracy for calculating the simulation signal approximate to the feedback audio signal. There have been cases of insufficiently preventing the howling.

On the other hand, the conventional karaoke machine for monitoring the risk of howling is configured only to notify the risk of howling and is incapable of preventing the howling. Further, when the configuration aims at decreasing the gain for a frequency that highly possibly causes the howling, there may be a possibility of degrading the quality of reproduction sound generated from the speaker.

SUMMARY OF THE INVENTION

In order to solve the above-mentioned problem, it is an object of the present invention to provide an audio amplification apparatus capable of more efficiently preventing the howling.

In order to solve the above-mentioned problem, the present invention adopts the following means.

The present invention provides an audio amplification apparatus connected to a microphone and a speaker comprising: an audio amplification circuit portion which amplifies an audio signal and inputs it to a speaker; a howling canceller having an adaptive filter for self-configuring a filter coefficient to simulate a feedback transmission path from the speaker to the microphone based on an audio signal input to the speaker and a residual signal, wherein the audio amplification circuit portion is supplied with the residual signal obtained by subtracting a simulation signal processed by the adaptive filter, from an audio signal input from the microphone; a sound source determination section for determining whether or not the audio signal input from the microphone contains an audio signal input from an external sound source other than an audio signal fed back from the speaker, and for controlling update of a filter coefficient of the adaptive filter in accordance with a result of the determination.

When an audio signal is input to the microphone, the howling canceller subtracts the simulation signal from the input signal to generate a residual signal that is then supplied to the audio amplification circuit portion. The audio amplification circuit portion amplifies the residual signal and inputs the signal to the speaker that sounds the signal. The simulation signal is processed by the adaptive filter. The adaptive filter self-configures a filter coefficient to simulate a feedback transmission path from the speaker to the microphone based on an audio signal input to the speaker and the residual signal. The simulation signal simulates a feedback sound traveling the feedback transmission path from the speaker to the microphone. The simulation signal is subtracted from an input signal to prevent the howling.

When the residual signal contains only a difference between the feedback audio signal and the simulation signal, this is an ideal state for accurately computing the filter coefficient. When a signal input to the microphone contains an audio signal generated from the external sound source, the residual signal supplied to the adaptive filter contains that external audio signal in addition to a difference between the feedback audio signal and the simulation signal. This is not an ideal state for accurately identifying the filter coefficient.

According to the above-mentioned configuration, the external sound source determination section determines whether or not to contain an audio signal input from the external sound source as well as an audio signal fed back from the speaker. Depending on a result of the determination, control is performed to update the adaptive filter coefficient. Accordingly, the adaptive filter can be updated by reflecting whether or not the state is ideal for accurately identifying the adaptive filter. The adaptive filter can be configured appropriately.

When the sound source determination section determines that only the audio signal fed back from the speaker is contained in an audio signal input from the microphone, it is configured to increase an adaptive updating speed of the adaptive filter compared to a case where the determination results inversely. The adaptive filter can be adapted at a high adapting speed when there is provided an ideal state for accurately identifying the adaptive filter coefficient. This makes it possible to improve the adaptive updating accuracy of the filter coefficient.

(2) In the above-mentioned audio amplification apparatus, the adaptive filter calculates an adaptive filter coefficient by adding a pre-update adaptive filter coefficient multiplied by a leakage factor with a correction amount multiplied by a step-size parameter, and updates the adaptive filter coefficient to the calculated one. When it is determined that an audio signal input from the microphone does not contain an audio signal input from the external sound source, the sound source determination section configures a large value for the step-size parameter compared to a case where the determination results inversely.

The larger the step-size, the more correction amount is reflected on the adaptive filter coefficient. Consequently, the larger the step-size, the higher the adaptive filter's adapting speed becomes. According to the above-mentioned configuration, when it is determined that an audio signal input from the microphone does not contain an audio signal input from the external sound source, a larger step-size is used to calculate the adaptive filter coefficient compared to a case where the determination results inversely. In this case, the adaptive filter's adapting speed increases compared to a case where it is determined that an audio signal input from the microphone contains an audio signal input from the external sound source.

(3) The above-mentioned audio amplification apparatus may constitute a karaoke machine which has a performance processing portion for playing back a karaoke tune as an internal sound source and which uses singer's singing voice as an external sound source. According to this configuration, the karaoke machine can allow the adaptive filter updating to reflect whether or not an audio signal input from the microphone contains an audio signal of singing voice by a singer.

(4) In the above-mentioned karaoke machine, the performance processing portion outputs, to a display portion, lyrics data for displaying lyrics in synchronization with the progress of a karaoke tune. When the performance processing portion outputs lyrics data, the sound source determination section determines that an audio signal input from the microphone contains an audio signal of singing voice by a singer as an external sound source. Normally, a singer sings a song by looking at the displayed lyrics. When the display portion is not supplied with the lyrics data for displaying the lyrics in synchronization with the progress of a karaoke tune, it is highly possible that an audio signal of singing voice by the singer is not contained in the audio signal input from the microphone. According to the configuration of the present invention, the sound source determination section determines that a singing voice signal is contained in the audio signal input from the microphone when the display portion is supplied with the lyrics data corresponding to an accompaniment audio signal input to the speaker. When the lyrics data is not output to the display portion, it is determined that a singing voice signal is not contained in the audio signal input from the microphone. Using such a simple process to determine whether or not lyrics data is output to the display portion, it is possible to determine whether or not a singing voice signal is contained in the audio signal input from the microphone.

(5) In the above-mentioned audio amplification apparatus, the sound source determination section determines that an audio signal input from the microphone contains a singing voice signal when a signal level of an audio signal input from the microphone exceeds a specified level even if the performance processing portion outputs no lyrics data. Although no lyrics data is output to the display portion, the configuration can determine that a singing voice signal is contained in the signal input from the microphone when the signal level of the signal input from the microphone exceeds a specified level. For example, there may be a case where a singer sings without lyrics or the audience around the singer speaks to input noise sounds to the microphone. This is not an ideal state for accurately identifying the filter coefficient similarly to the case where live singing sounds are input. When an audio signal input from the microphone exceeds a specified level, it is determined that a singing voice signal is input. This case can be treated in the same manner as the case where a singing voice signal is actually input. The signal level needs to be determined only when no lyrics data is output. It is possible to determine the presence or absence of a singing voice signal with relatively small process loads.

According to the present invention, the external sound source determination portion determines whether or not an external audio signal from the external sound source is contained in a signal input from the microphone. The adaptive filter is updated based on the determination result. When an audio signal from the external sound source is not contained in the signal input from the microphone, the residual signal does not contain an audio signal from the external sound source and substantially approximates to a difference between the feedback audio signal and the simulation signal. Accordingly, the residual signal becomes ideal for accurately configuring the adaptive filter. The present invention can update the adaptive filter coefficient by reflecting whether or not the state is ideal for accurately identifying the adaptive filter. The adaptive filter coefficient can be identified appropriately. This makes it possible to provide the audio amplification apparatus capable of effectively preventing the howling.

The embodiment positively identifies the adaptive filter while no singing voice signal is input to the microphone, i.e., while it is ideal for accurately configuring the adaptive filter. The embodiment decreases the degree of updating rate (decreases the step-size value) while a singing voice signal is input from the microphone.

DETAILED DESCRIPTION OF THE INVENTION

First Embodiment

Figure 1:
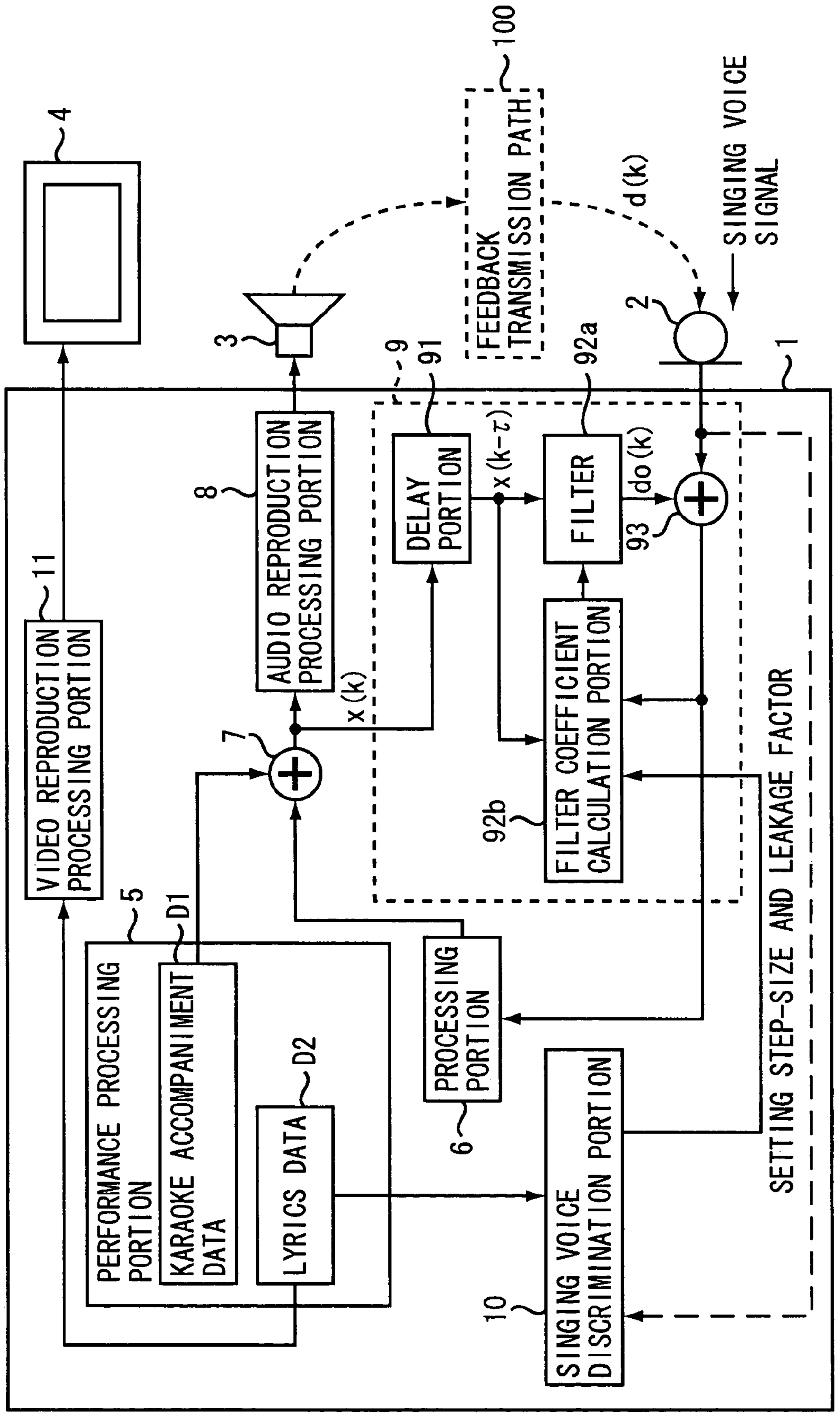
FIG. 1 is a block diagram showing the schematic configuration of a karaoke machine according to a first embodiment of the present invention.

FIG. 1 is a block diagram showing the schematic configuration of a karaoke machine 1 according to a first embodiment of the present invention. The karaoke machine 1 is connected to a microphone 2, a speaker 3, and a display portion 4 placed indoors. The karaoke machine 1 is composed of a performance processing portion 5, an audio processing portion 6, an adder portion 7, an audio reproduction processing portion 8, a howling canceller 9, a singing voice discrimination portion 10, and a video reproduction processing portion 11.

The microphone 2 collects sounds as a microphone input signal from the outside of the system. The microphone input signal is converted from analog to digital by an A/D (Analog/Digital) converter. The A/D-converted signal is output to the processing portion 6 via the howling canceller 9. Sounds input to the microphone 2 include a singing voice when a singer (equivalent to an external sound source) sings. The singing voice is converted into an electric signal, i.e., a singing voice signal (equivalent to an audio signal supplied from the external sound source). The singing voice signal is included in the input signal.

The speaker 3 acoustically transforms an analog audio signal supplied from the karaoke machine 1 to generate sounds. The display portion 4 is provided in the form of a CRT (Cathode Ray Tube) display, an LCD (Liquid Crystal Display), and the like, for example.

The performance processing portion 5 is composed of a CPU (Central Processing Unit) and a storage portion such as memory and a hard disk. The performance processing portion 5 executes a control program for karaoke performance. Specifically, the performance processing portion 5 stores karaoke accompaniment data D1 and lyrics data D2. The performance processing portion 5 corresponds to an internal sound source according to the present invention. Based on the karaoke accompaniment data D1, the performance processing portion 5 generates karaoke accompaniment audio signals and sequentially outputs them to the adder portion 7. In synchronization with the karaoke accompaniment audio signal output, the performance processing portion 5 sequentially outputs the lyrics data D2 to the video reproduction processing portion 11. The karaoke accompaniment data D1 is used to reproduce a karaoke tune's accompaniment sound. The lyrics data D2 is used to display lyrics of the karaoke tune played by using the karaoke accompaniment audio signal. According to the lyrics data D2, the display portion 4 displays lyrics and changes character colors thereof in accordance with the progress of the karaoke accompaniment tune. That is, the lyrics data D2 includes lyrics' character data and character color change data.

The audio processing portion 6 includes an equalizer and the like and performs signal processes for microphone input signals supplied via the A/D converter (not shown) through the howling canceller 9. Specifically, the processing portion 6 adjusts signal's frequency characteristics and digitally amplifies the signals.

The adder portion 7 mixes the karaoke accompaniment audio signal output from the performance processing portion 5 with the signal processed by the processing portion 6 (mixing process). The adder portion 7 outputs a mixed audio signal (synthesized audio signal x(k)) to the audio reproduction processing portion 8 and the howling canceller 9.

The audio reproduction processing portion 8 D/A (Digital/Analog) converts the synthesized audio signal x(k) supplied from the adder portion 7, amplifies the converted analog audio signal, and inputs it to the speaker 3. The audio processing portion 6 and the audio reproduction processing portion 8 constitute an audio amplification circuit according to the present invention.

The howling canceller 9 includes a delay portion 91, an adaptive filter 92, and an adder portion 93. The delay portion 91 and the adaptive filter 92 simulate a feedback transmission path 100. In the drawings, the feedback transmission path 100 is symbolically depicted by a dot line block. In the howling canceller 9, the delay portion 91 simulates delay time $\tau$ for a feedback sound via the feedback transmission path 100. The adaptive filter 92 simulates a transfer function, i.e., audio propagation characteristics of the feedback transmission path 100.

Specifically, the delay portion 91 delays the synthesized audio signal x(k) for delay time $\tau$ and outputs the delayed synthesized audio signal x(k-$\tau$) to the adaptive filter 92. The adaptive filter 92 includes a digital filter 92*a* (typically FIR: Finite Impulse Response filter) and a filter coefficient calculation portion 92*b* to determine a filter coefficient of the digital filter 92*a*. The digital filter 92*a* convolutes the input synthesized audio signal x(k-$\tau$) with the filter coefficient to generate a simulation signal do(k). The digital filter 92*a* outputs the generated simulation signal do(k) to the adder portion 93.

The filter coefficient calculation portion 92*b* estimates a transfer function of the feedback transmission path 100 based on a residual signal output from the adder portion 93 and the synthesized audio signal x(k-$\tau$) supplied from the delay portion 91. The filter coefficient calculation portion 92*b* corrects the filter coefficient for the digital filter 92*a* by conforming to (simulating) the transfer function to thereby self-configure the filter coefficient. This correction is performed at a specified time interval (e.g., several microseconds to several hundreds of microseconds) so as to possibly minimize the residual signal. An adaptive algorithm is used to estimate the transfer function of the feedback transmission path 100 and to correct the filter coefficient (to be described later in detail). Applicable adaptive algorithms may include, for example, the learning identification method, the LSM method, the projection method, and the RLS method. Concurrently with output from the speaker, the synthesized audio signal x(k) is supplied to the delay portion 91 and the adaptive filter 92. This makes it possible to approximate the simulation signal do(k) output from the adaptive filter 92 to the feedback audio signal d(k).

The adder portion 93 is supplied with the simulation signal do(k) and the microphone input signal. The adder portion 93 outputs the microphone input signal subtracted by the simulation signal do(k) to the processing portion 6 and outputs the same signal as a reference signal to the filter coefficient calculation portion 92*b*. This makes it possible to remove feedback components from the microphone input signal and to prevent the howling.

The singing voice discrimination portion 10 is implemented by a determination program executed in the CPU (Central Processing Unit) to constitute a sound source determining portion. The singing voice discrimination portion 10 performs a determination process to determine whether or not the microphone signal contains a singing voice signal. The singing voice discrimination portion 10 detects whether or not the lyrics data D2 corresponding to the karaoke accompaniment audio signal output to the adder portion 7 is output from the performance processing portion 5 to the display portion 4 via the video reproduction processing portion 11. When the lyrics data D2 is output, the singing voice discrimination portion 10 determines that the microphone input signal contains a singing voice signal. Normally, a singer sings a song by looking at the displayed lyrics. For this reason, when the lyrics data D2 corresponding to the karaoke accompaniment audio signal is not output, it is highly possible that no singing voice signal is input to the microphone 2. This makes it possible to determine that the microphone input signal does not contain a singing voice signal.

Based on the determination result, the singing voice discrimination portion 10 controls updating of the adaptive filter 92. When no singing voice signal is contained in the microphone input signal, the residual signal input to the filter coefficient calculation portion **92*b* contains no singing voice signal and therefore approximates to a difference between the feedback audio signal d(k) and the simulation signal do(k). As the residual signal further approximates to the difference between the feedback audio signal d(k) and the simulation signal do(k), it is ideal to decrease an identification error of the filter coefficient for the adaptive filter 92. When no singing voice signal is determined to be contained in the microphone input signal, the singing voice discrimination portion 10 increases the degree of updating rate for the adaptive filter 92 and positively updates the adaptive filter 92. At this time, the degree of coefficient identification is increased as compared to a case where a singing voice signal is contained in the microphone input signal. Accordingly, the adaptive filter 92** can be configured with a small identification error.

The video reproduction processing portion 11 is composed of video memory, a video processing circuit, and the like, for example. The video reproduction processing portion 11 is supplied with the lyrics data D2 from the performance processing portion 5. The lyrics data D2 corresponds to the karaoke accompaniment audio signal output to the adder portion 7. The video reproduction processing portion 11 generates a character pattern based on the lyrics data D2 output from the performance processing portion 5. The video reproduction processing portion 11 allows the display portion 4 to display lyrics in synchronization with the karaoke accompaniment sounded from the speaker. There may be a case where the performance processing portion 5 stores a background picture and inputs it. In such case, the video reproduction processing portion 11 synthesizes the input background picture with the lyrics data D2 and displays the synthesized picture.

Figure 2:
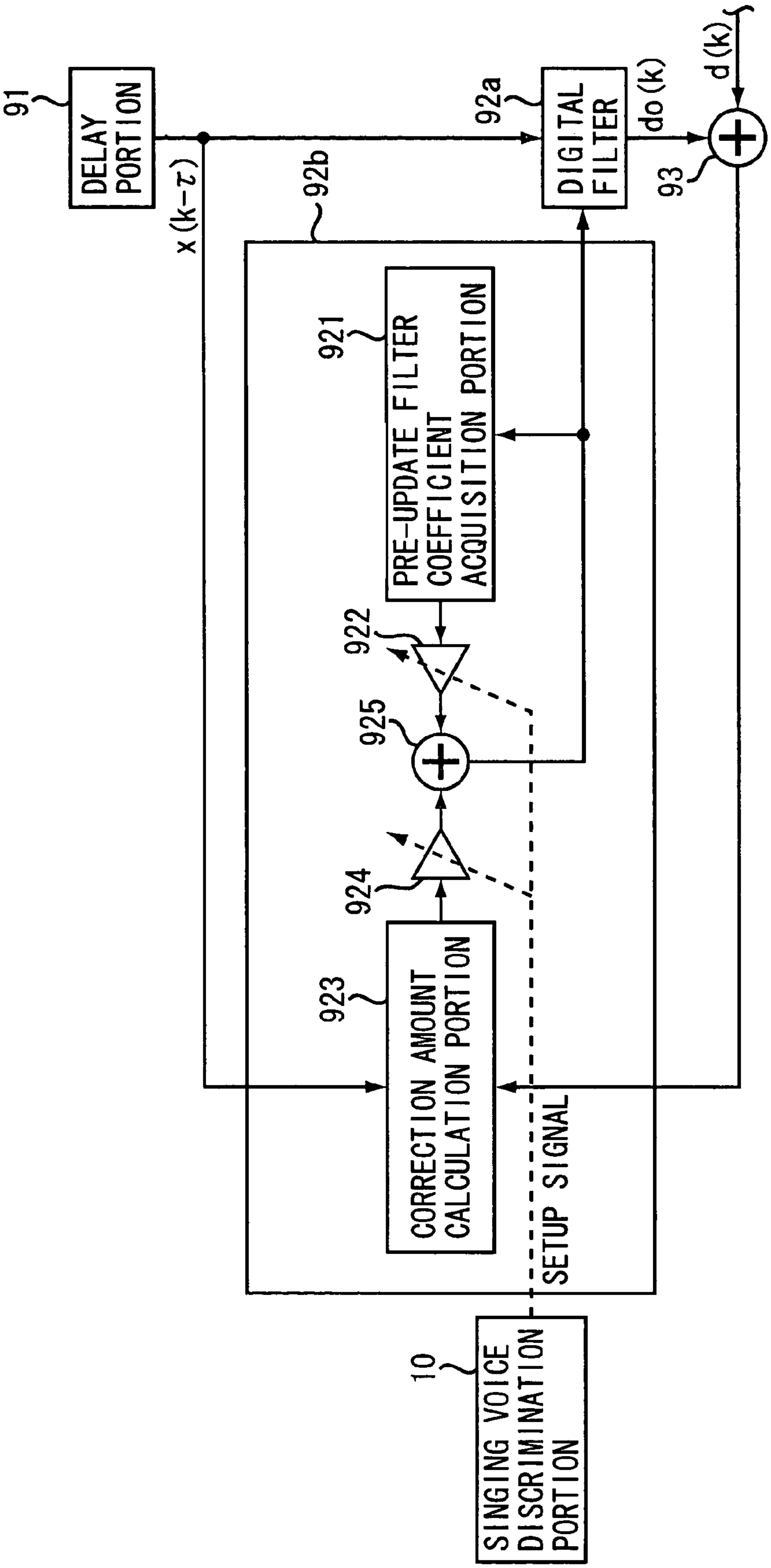
FIG. 2 is a block diagram showing the configuration of the filter coefficient calculation portion in FIG. 1 and its associated components.

FIG. 2 is a block diagram showing the configuration of the filter coefficient calculation portion **92*b* in FIG. 1 and its surrounding components. The filter coefficient calculation portion 92*b* includes a pre-update filter coefficient acquisition portion 921, a leakage factor multiplier portion 922, a correction amount calculation portion 923, a step-size multiplier portion 924, and an adder portion 925**

The pre-update filter coefficient acquisition portion 921 stores an adaptive filter coefficient before update and outputs this coefficient to the leakage factor multiplier portion 922 at a specified time interval. The leakage factor multiplier portion 922 multiplies the pre-update adaptive filter coefficient output from the pre-update filter coefficient acquisition portion 921 by a leakage factor to output the result to the adder portion 925.

The correction amount calculation portion 923 calculates a correction amount using a known adaptive algorithm based on the residual signal output from the adder portion 93 and the synthesized audio signal x(k-τ) output from the delay portion 91. The correction amount calculation portion 923 outputs the correction amount to the step-size multiplier portion 924 at a specified time interval synchronized with the output interval of the pre-update filter coefficient acquisition portion 921. The step-size multiplier portion 924 multiplies the input correction amount by a step-size parameter and outputs a resulting value to the adder portion 925.

The step-size parameter can be provided as at least two values, i.e., large and small ones. When the singing voice discrimination portion 10 determines that the microphone input signal contains a singing voice signal, the singing voice discrimination portion 10 specifies a small step-size. When the singing voice discrimination portion 10 determines that the microphone input signal contains no singing voice signal, the singing voice discrimination portion 10 specifies a large step-size parameter.

The adder portion 925 adds a value output from the leakage factor multiplier portion 922 and a value output from the step-size multiplier portion 924 to find an adaptive filter coefficient. That is, the adaptive filter coefficient is found by adding (a) a value resulting from multiplying the pre-update adaptive filter coefficient by the leakage factor and (b) a value resulting from multiplying the correction amount derived from the residual signal and the input signal by the step-size.

As mentioned above, when a larger step-size is specified, the correction amount is reflected more to the updated filter coefficient. The adaptive filter coefficient is updated positively. When the singing voice discrimination portion 10 determines that the microphone input signal contains no singing voice signal, an update value to be configured is larger than the value used for the case where the determination is not positive. Accordingly, the adaptive filter coefficient is updated positively when the singing voice discrimination portion 10 determines that the microphone input signal contains no singing voice signal, i.e., when it is ideal to appropriately identify the filter coefficient for the adaptive filter 92.

The adder portion 925 uses the calculated adaptive filter coefficient to update the adaptive filter coefficient value for the filter **92*a*. In addition, the adder portion 925 updates the pre-update adaptive filter coefficient value stored in the pre-update filter coefficient acquisition portion 921**.

Figure 3:
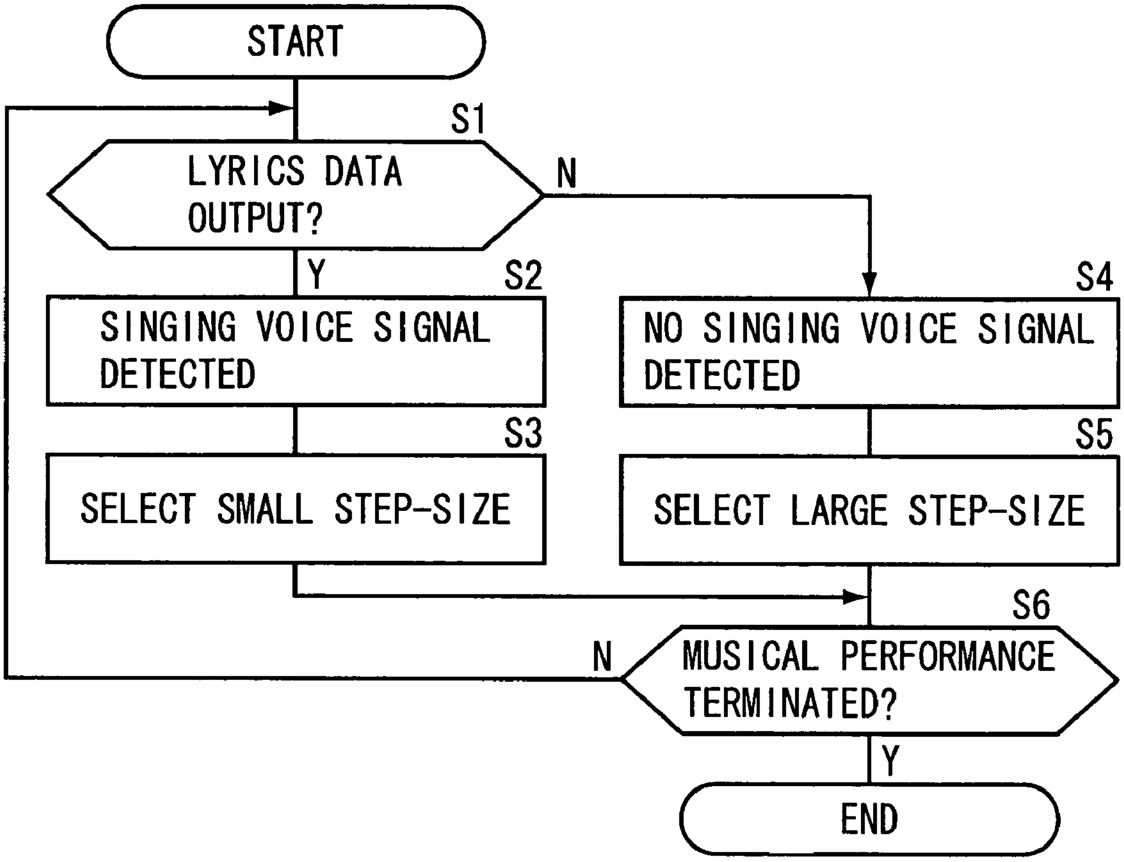
FIG. 3 is flowchart exemplifying a determination process performed by the karaoke machine in FIG. 1.

FIG. 3 is a flowchart exemplifying a determination process performed by the karaoke machine 1 in FIG. 1. This process starts, for example, when the singing voice discrimination portion 10 detects that the karaoke accompaniment audio signal for the audio reproduction processing portion 8 is read into the adder portion 7. The singing voice discrimination portion 10 determines whether or not the performance processing portion 5 outputs the lyrics data D2 corresponding to the requested karaoke accompaniment audio signal to the display portion 4 (S1).

It may be determined that the lyrics data D2 corresponding to the requested karaoke accompaniment audio signal is output to the display portion 4 (YES at S1). In this case, the singing voice discrimination portion 10 determines that a singing voice signal is contained in the microphone input signal (S2). The singing voice discrimination portion 10 selects a smaller step-size for the step-size multiplier portion 924 (S3). The singing voice discrimination portion 10 then performs Step 6 to be described later.

It may be determined occasionally that the lyrics data D2 corresponding to the requested karaoke accompaniment audio signal is not output to the display portion 4 (NO at S1). In this case, the singing voice discrimination portion 10 determines that no singing voice signal is contained in the microphone input signal (S4). The singing voice discrimination portion 10 selects a larger step-size for the step-size multiplier portion 924 (S5).

At Step S1, it is determined whether or not the lyrics data D2 corresponding to the requested karaoke accompaniment audio signal is output to the display portion 4. When the lyrics data D2 is output, it is determined that a singing voice signal is contained in the microphone input signal. When the lyrics data D2 is not output, it is determined that no singing voice signal is contained in the microphone input signal. Normally, a singer sings a song by looking at the displayed lyrics. When no lyrics data is output to the display portion 4, no lyrics are displayed. The singer is assumed not to sing. The above-mentioned configuration simply determines whether or not the lyrics data D2 is output to the display portion 4. This configuration can be used to relatively accurately determine whether or not the microphone input signal contains a singing voice signal.

The singing voice discrimination portion 10 determines whether or not the karaoke accompaniment audio signal output terminates (S6). When it is not determined that the karaoke accompaniment audio signal output terminates (NO at S6), the singing voice discrimination portion 10 returns the process to Step S1. When it is determined that the karaoke accompaniment audio signal output terminates (YES at S6), the singing voice discrimination portion 10 terminates the process.

According to the above-mentioned configuration, when it is determined that a singing voice signal is contained in the microphone input signal, the embodiment configures a smaller step-size than the one for the case where no singing voice signal is contained. When a larger step-size is configured, the greater correction amount component is reflected to update the adaptive filter coefficient. The adaptive filter 92 is updated positively (to increase the adaptive filter's adapting speed).

As mentioned above, when no singing voice signal is contained in the input signal, only a difference between the feedback audio signal d(k) and the simulation signal do(k) is input to the adaptive filter 92 as the reference signal. Accordingly, the residual signal becomes ideal for calculating the adaptive filter coefficient so as to approximate the simulation signal do(k) to the feedback audio signal d(k). It is possible to decrease an identification error of the filter coefficient for the adaptive filter 92. In this case, the embodiment positively updates the adaptive filter 92, thereby accurately approximating the simulation signal do(k) to the feedback audio signal d(k). This makes it possible to improve the howling prevention effect.

Second Embodiment

Figure 4:
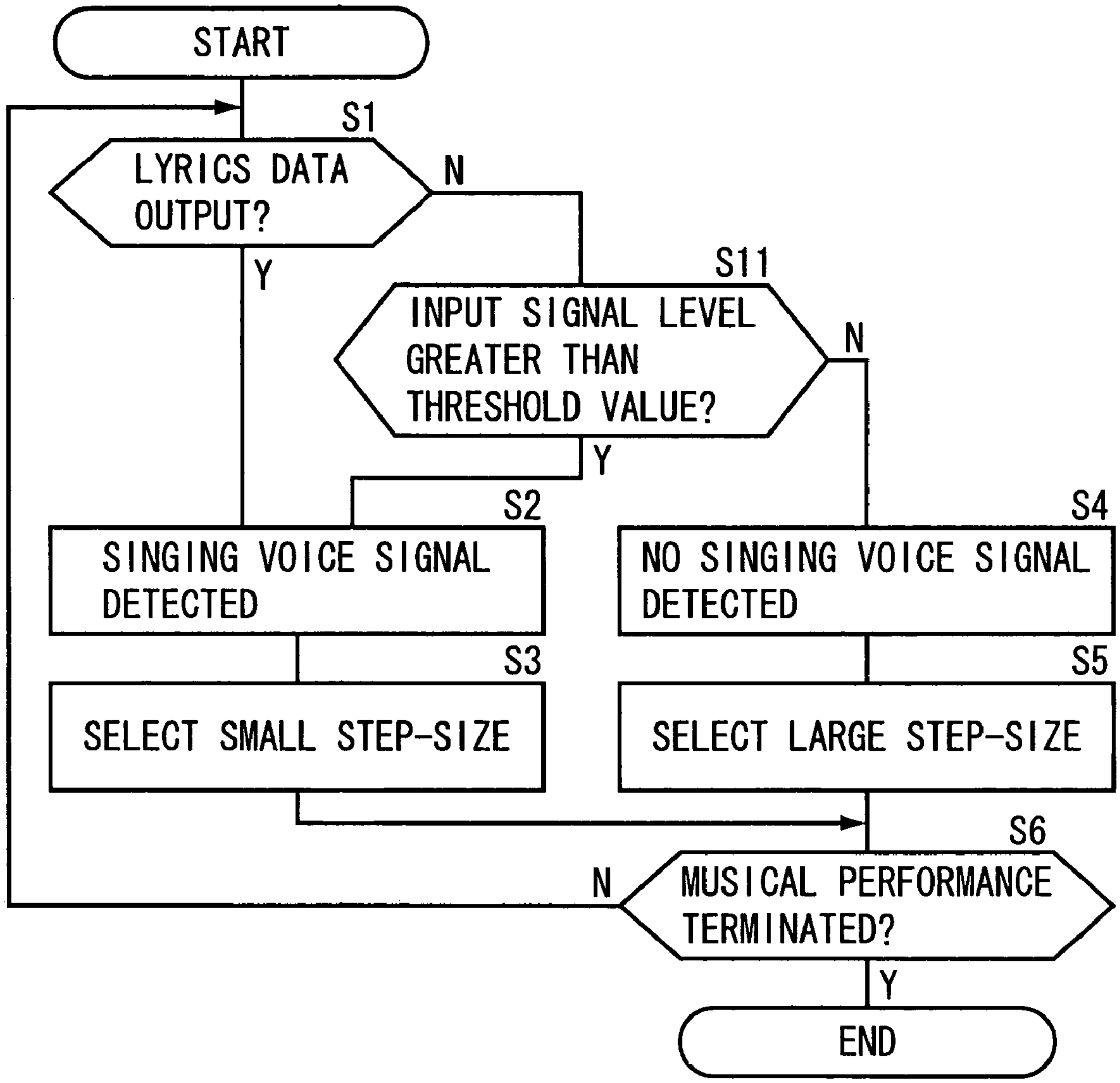
FIG. 4 is a flowchart exemplifying a determination process according to the second embodiment.

Referring now to FIGS. 1 and 4, the following describes a second embodiment of the present invention. According to the first embodiment, when the lyrics data D2 corresponding to the requested karaoke accompaniment audio signal is not output to the display portion 4, the singing voice discrimination portion 10 determines that the microphone input signal contains no singing voice signal. Even in such a case, the second embodiment assumes that a singing voice signal is contained when the microphone input signal exceeds a specified level.

With reference to FIG. 1, the singing voice discrimination portion 10 is supplied with the microphone input signal as indicated by a broken arrow. The singing voice discrimination portion 10 uses the microphone input signal's level to determine whether or not the microphone input signal contains a singing voice signal.

FIG. 4 is a flowchart exemplifying a determination process according to the second embodiment. The mutually corresponding steps in FIGS. 4 and 3 are designated by the same reference numerals to indicate similar processes. At Step S1, it may be determined that the lyrics data D2 corresponding to the requested karaoke accompaniment audio signal is not output to the display portion 4 (NO). In this case, the singing voice discrimination portion 10 determines whether or not the microphone input signal's level is greater than a threshold value (S11). When the signal level is determined to be greater than the threshold value (YES at S11), it is determined at Step S2 that a singing voice signal is contained in the microphone input signal. Thereafter, similarly to the process in FIG. 3, steps S3 and S6 are performed. When the signal level is determined not to be greater than the threshold value (NO at S11), it is determined at Step S4 that no singing voice signal is contained in the microphone input signal. Thereafter, similarly to the process in FIG. 3, steps S5 and S6 are performed.

According to the above-mentioned configuration of the second embodiment, occasionally it may be determined that the performance processing portion 5 outputs no lyrics data D2 corresponding to the requested karaoke accompaniment audio signal to the display portion 4. In this case, when the input signal level is greater than the threshold value, it is determined that the microphone input signal contains a singing voice signal. There may be a case where a singer sings without lyrics or the audience around the singer speaks loudly. In such case, the microphone input signal contains a singing voice signal or an audio signal of speaking noise. This is not an ideal state for accurately operating the adaptive filter 92. To solve this, the second embodiment determines a singing voice signal to be contained in the microphone input signal by setting a threshold value when the microphone input signal exceeds the threshold value. This state can be treated in the same manner as the case where a singing voice signal is actually contained in the microphone input signal. In this manner, it is possible to further improve the identification accuracy of the filter coefficient for the adaptive filter 92 compared to the first embodiment.

It just needs to determine the microphone input signal level preferably when the lyrics data D2 corresponding to the requested karaoke accompaniment audio signal is not output. It is possible to determine whether or not a singing voice signal is contained in the microphone input signal with relatively small process loads.

The embodiments can incorporate the following modifications.

(1) The above-mentioned embodiments use only different step-sizes depending on whether or not the microphone input signal contains a singing voice signal. It may be preferable to select leakage factors similarly in addition to the step-sizes. In such case, for example, the leakage factor is configured to be assigned two values, i.e., large and small ones. When the singing voice discrimination portion 10 determines that the microphone input signal contains a singing voice signal, the singing voice discrimination portion 10 specifies a larger value. When the singing voice discrimination portion 10 determines that the microphone input signal contains no singing voice signal, the singing voice discrimination portion 10 specifies a smaller value. When a larger leakage factor is specified, more pre-update filter coefficient component is reflected to the updated filter coefficient. The adaptive filter coefficient is updated negatively.

(2) While the above-mentioned embodiments feed the same signal as the synthesized audio signal x(k) output to the audio reproduction processing portion 8 to the delay portion 91, the present invention is not limited thereto. According to the embodiments, the performance processing portion 5 outputs the generated karaoke accompaniment audio signal to the howling canceller 9. Further, the adder portion 7 may be disposed posterior to the howling canceller 9 toward the rear (the speaker side). The sound may be generated from the speaker without supplying the karaoke accompaniment audio signal to the howling canceller 9.

(3) According to the above-mentioned embodiments, the karaoke machine 1 is externally attached with the microphone 2, the speaker 3, and the display portion 4. These components may be provided integrally. While the embodiments of the present invention are applied to the karaoke machine 1, the present invention is not limited thereto. For example, the present invention may be applied to audio amplification apparatuses such as audio devices and AV devices that have a function to generate audio signals from an internal sound source and input them to a speaker.

(4) An audio signal generated in the internal sound source such as the performance processing portion 5 is not limited to the karaoke accompaniment audio signal. Audio signals generated in the system may include those for sounds generated by singing or playing musical instruments, chorus sounds, and the like. An audio signal input from the external sound source is not limited to the singing voice signal. For example, audio signals may be input via the microphone 2 such as those for talking voices, sounds from players of musical instruments (equivalent to the external sound source), and sounds generated by audio devices and AV devices (equivalent to the external sound source). In this case, no lyrics data is displayed on the display portion 4. For example, a microphone input signal level may be compared with the threshold value to determine that the microphone input signal contains an audio signal input to the microphone 2 from an external sound source.

(5) When it is determined that no singing voice signal is contained in the microphone input signal, the above-mentioned embodiments increase the adapting speed of the adaptive filter 92 by increasing the step-size and by decreasing the leakage factor compared to the case where a singing voice signal is contained. The present invention is not limited thereto. It may be preferable to decrease an interval to update the adaptive filter 92.

(6) Throughout the specification, it is determined whether or not the microphone input signal level exceeds (is greater than) a threshold value. Instead, it may be preferable to determine whether or not the microphone input signal level is greater than or equal to a threshold value.

The invention claimed is:

1. An audio amplification apparatus connected to a microphone and a speaker, which constitute a feedback transmission path of an audio signal, the apparatus comprising:

an audio amplification circuit which amplifies an audio signal and inputs the amplified audio signal to the speaker;

a howling canceller having an adaptive filter which is set with a filter coefficient based on the audio signal input to the speaker and a residual signal so as to simulate the feedback transmission path from the speaker to the microphone such that the adaptive filter processes the audio signal to produce a simulation signal, said residual signal being obtained by subtracting the simulation signal from an input audio signal inputted from the microphone and being fed to the audio amplification circuit;

an internal sound source which generates the audio signal and inputs the audio signal to the speaker; and a sound source determination portion which determines whether or not the input audio signal inputted from the microphone contains an external audio signal provided from an external sound source other than the audio signal fed back from the speaker to the microphone and which controls update of the filter coefficient for the adaptive filter in accordance with a result of the determination.

2. The audio amplification apparatus according to claim 1, wherein the adaptive filter updates the filter coefficient by adding a pre-update filter coefficient multiplied by a leakage factor with a correction amount multiplied by a step-size parameter, and wherein when the sound source determination portion determines that the input audio signal inputted from the microphone does not contain the external audio signal from the external sound source, the sound source determination portion sets a large value for the step-size parameter compared to a case where the sound source determination portion determines that the input audio signal inputted from the microphone does contain the external audio signal.

3. The audio amplification apparatus according to claim 1, which constitutes a karaoke machine and which uses the internal sound source as a performance processing portion for playing back a karaoke tune, while the external sound source provides a live singing voice which is sounded in synchronization with the karaoke tune.

4. The audio amplification apparatus according to claim 3, wherein the performance processing portion outputs lyrics data to a display for displaying lyrics in synchronization with the progress of the karaoke tune, and wherein, when the performance processing portion outputs the lyrics data, the sound source determination portion determines that the input audio signal inputted from the microphone contains the external audio signal in the form of the live singing voice as the external sound source.

5. The audio amplification apparatus according to claim 4, wherein the sound source determination portion determines that the input audio signal inputted from the microphone contains the external audio signal in the form of the live singing voice when a signal level of the input audio signal inputted from the microphone exceeds a specified level even if the performance processing portion outputs no lyrics data.

6. The audio amplification apparatus according to claim 1, wherein the sound source determination portion determines that the input audio signal inputted from the microphone contains the external audio signal when a signal level of the input audio signal inputted from the microphone exceeds a specified level.

7. A howling cancel method performed in an audio amplification apparatus connected to a microphone and a speaker, which constitute a feedback transmission path of an audio signal, wherein the audio amplification apparatus comprises an audio amplification circuit which amplifies an audio signal and inputs the amplified audio signal to the speaker, a howling canceller having an adaptive filter which is set with a filter coefficient based on the audio signal input to the speaker and a residual signal so as to simulate the feedback transmission path from the speaker to the microphone such that the adaptive filter processes the audio signal to produce a simulation signal, said residual signal being obtained by subtracting the simulation signal from an input audio signal inputted from the microphone and being fed to the audio amplification circuit, and an internal sound source which generates the audio signal and inputs the audio signal to the speaker, the howling cancel method comprising the steps of:

determining whether or not the input audio signal inputted from the microphone contains an external audio signal provided from an external sound source other than the audio signal fed back from the speaker to the microphone; and controlling update of the filter coefficient for the adaptive filter in accordance with a result of the determination.

8. The howling cancel method according to claim 7, wherein the audio amplification apparatus constitutes a karaoke machine and uses the internal sound source as a performance processing portion for playing back a karaoke tune, while the external sound source provides a live singing voice which is sounded in synchronization with the karaoke tune, and wherein the determining step determines that the input audio signal inputted from the microphone contains the external audio signal in the form of the live singing voice from the external sound source when the performance processing portion outputs lyrics data to a display device for displaying lyrics in synchronization with the progress of the karaoke tune.

9. The howling cancel method according to claim 8, wherein the determining step determines that the input audio signal inputted from the microphone contains the external audio signal in the form of the live singing voice when a signal level of the input audio signal inputted from the microphone exceeds a specified level even if the performance processing portion outputs no lyrics data.

* * * * *